Sept. 14, 1954 W. ZORN 2,688,947

TUNING CONTROL MECHANISM FOR BROADCAST RECEIVERS

Filed Oct. 13, 1951 2 Sheets-Sheet 1

Inventor:
Werner Zorn

Inventor:
Werner Zorn

Patented Sept. 14, 1954 2,688,947

UNITED STATES PATENT OFFICE 2,688,947

TUNING CONTROL MECHANISM FOR BROADCAST RECEIVERS

Werner Zorn, Berlin-Zehlendorf, Germany

Application October 13, 1951, Serial No. 251,228

7 Claims. (Cl. 116—124.4)

The present invention relates to a tuning control mechanism for broadcast receivers the particular object of which is quickly to recover the exact setting of a broadcast receiver to a special wanted transmitter station.

For the correct reception of a radio transmission in the broadcast receiver two tasks must be solved: Firstly, the wanted transmitter station must be tuned-in by means of the dial pointer and, secondly, the best possible quality of tone must be adjusted either by ear or by means of suitable electrical or mechanical devices. For solving the second task devices are known which indicate the optimal sharpness of tuning by electrical-optical means. All these devices, however, require two separate operations for solving the two tasks mentioned above.

Considerable shortcomings have resulted if electrical or electric-mechanical devices were employed for the sharp tuning-in of the receiver. The "magic eye" for instance is useless at weak transmitters. Even at the reception of powerful transmitters the zone of optimal adjustment in the "magic eye" is so wide that an exact tuning-in can be accomplished only with difficulties. A further impediment is that for tuning-in by means of the "magic eye" a certain experience is needed because the optimal arrangement is not optically fixed by any scale lines but must be adjusted by a more or less successful trial and error method. An undesirable loss of time cannot be avoided as the dial for tuning-in the wanted transmitter is arranged too far from the device for adjusting the optimal sharpness of tuning.

It is the object of the present invention to provide a new mechanism for tuning-in at which the station dial and the fine adjustment of the sharpness of tuning can be observed with one glance. The invention makes it possible to tune-in the station much more rapidly than now and with extraordinary exactness. This new device can be connected, too, with the usual tuning dials whereat preferably a limited number of stations, commonly the local transmitters, can be tuned-in at choice.

According to the present invention, a beam of light is moved at this tuning-in by means of a dial pointer, this beam of light impinging on adjustable slides which are preferably designed as opaque screens, e. g. of frosted glass, and arranged on or close to the tuning dial. The exact tuning adjustment of the receiver is easily accomplished by bringing the beam of light into coincidence with marks on the opaque screen of the slide. Besides that, the beam of light can be subdivided by a partial covering of the slide screen whereat, for tuning adjustment, the single sections of the light beam must be compared one with another. For sharp tuning these two portions of the light beam must be, for instance, adjusted to equal width.

In the drawing different embodiments of the device corresponding to this invention are shown by way of example.

Figure 1:
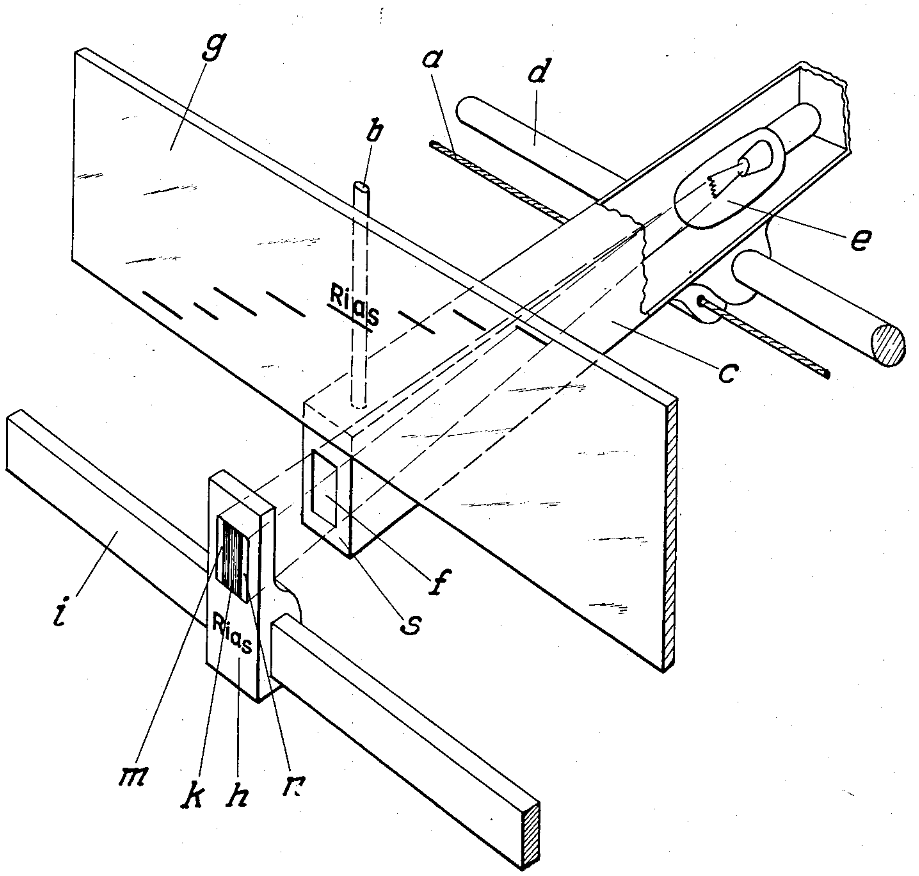
Fig. 1 represents one design according to the invention.

Referring to Fig. 1 the cord *a*, which up to now moved only the dial pointer *b*, now draws a small casing *c* sliding along a rod *d*. The casing *c* carries at one end an electric light bulb *e*, at the other end a rectangular slot *f* and on the upper wall the dial pointer *b*. For tuning-in the cord *a* is moved to or fro whereat the dial pointer *b* moves in the usual way behind the glass dial *g*. The beam of light coming from the slot *f* covered by a mask *s* impinges on a transparent slide *h* which is mounted on the sliding bar *i* so that it can be adjusted in a direction parallel to the glass dial. This slide is provided e. g. with the transmitter mark RIAS and is adjusted exactly to the wavelength of the transmitter RIAS. That surface of the slide *h* on which the beam of light impinges is designed as an opaque screen so that the observer sees the impinging light beam on this opaque screen as a rectangular image of the slot. On the opaque screen of the slide *h* a mark *k* is arranged the width of which is a little smaller than that of the impinging beam of light.

If this device shall be employed for the quick-tuning-in, e. g. of the transmitter RIAS, the latter is, for the first time, looked for at the normal tuning dial *g* and is tuned-in by ear as exactly as possible. Now the slide *h* is adjusted so that the beam of light coming from the slot *f* impinges on both sides of the mark *k* arranged on the slide *h*.

This subdivision of the beam of light must be adjusted so that the illuminated portions *m* and *n*, which are visible at both sides of the black mark *k*, are of equal width. If this adjustment has been made once for all, the same position of the respective transmitter station can be very easily and quickly recovered with the utmost exactness. The light beam is moved along till it impinges on the slide *h* and care is taken that the two narrow illuminated portions at both sides of the mark *k* are adjusted to equal width. Then the exact tuning adjustment of the receiver is attained.

For the sake of better distinctiveness or nicer appearance the beam of light can be sent through a colored filter or the slides can be colored, wholly or partially, with one or more colors. The colored filter may be interposed for example before the slot *f* (see Fig. 1) and inserted into the slot of the mask *s*.

The slides can be arranged also in such a way that they slide along the upper or lower edge of the glass dial so that the sliding bar *i* will not be needed. They must be easily adjustable by hand and can be provided for this purpose with a hole or with a knob for catching hold of them.

Figure 2:
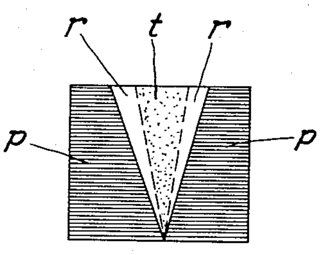
Figs. 2 and 3 show other possible designs of the adjusting marks on the slide.
Figure 3:
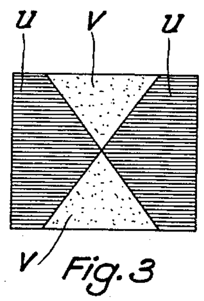

The Figures 2 and 3 show other possible designs of the adjusting marks on slide *h*. In Fig. 2 the portions *p* represent the adjusting mark on the slide outlining the wedge *r*, whereas the dotted portion *t* of wedge form shows the contour of the light beam impinging on the screen of the slide *h* in case of exact tuning adjustment of the receiver. At asymmetrical adjustment of the light beam the thin end of the illuminated wedge *t* would be displaced upwards on the corresponding side of *p*, whereas at correct adjustment the thin ends of the two wedges *t* and *r* must coincide as shown in Fig. 2.

In Fig. 3 there is shown another form of a tuning mark, the portions *u* of which outline a double wedge *v* and are colored e. g. in red. Owing to the floodlight of the glass dial those portions of the slide which are not colored are looking white respectively green. At correct adjustment of the impinging beam of light, which also has the form of the two dotted wedges *v*, the single sectors are covered without shady borders, thus resulting in one single red surface. The beam of light, of course, also must be of red color, for example by means of a red filter means inserted into the mask *s* covering the slot *f*.

Figure 4:
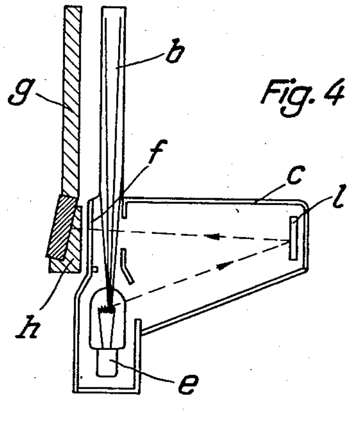
Fig. 4 shows a further embodiment of the tuning device, wherein the dial pointer, too, is illuminated from inside.

The electric bulb *e* can be employed, too, for illuminating the dial pointer *b* from inside. In Fig. 4 a solution of this problem is shown by way of example. The drawing shows: Dial pointer *b*, lamp casing *c*, electric bulb *e*, slot *f*, glass dial *g*, slide *h*, mirror *l*. The light of the bulb *e* goes directly into the dial pointer *b* which is designed as a glass rod and provided e. g. with a transparent white coating. Another part of the light of the bulb impinges on the mirror *l* and is reflected through the slot *f* to the opaque screen of the slide *h* serving for the illumination of the adjusting mark on slide *h*. The tuning-in of the optimal sharpness takes place according to the examples described above.

Figure 5:
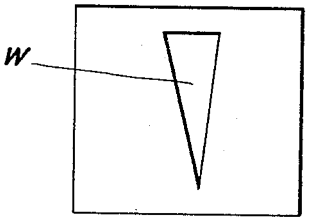
Figure 6:
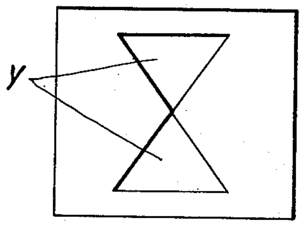

Figs. 5 and 6 show two forms of the mask forming the contour of the light beam. The mask according to Fig. 5 outlines the wedge *w* and is used together with the tuning mark *p* shown in Fig. 2. The mask according to Fig. 6 outlines the double wedge *y* and is suitable for a tuning system using tuning marks *u* shown in Fig. 3.

The device corresponding to this invention allows the quick and easy tuning adjustment to any station. The slides *h* are arranged so that they can be easily adjusted from outside. Preferably only so many slides will be employed as correspond to the number of preferred stations, i. e. for the local transmitters and some of those remote transmitters which can be well received at the respective locality. The user of the set adjusts the slides to the transmitters chosen by him and is thus able to tune-in quickly, easily, and sharply each of these preferred stations.

What I claim is:

1. Tuning indicator mechanism for radio receivers, comprising a station dial, a pointer, a light source for producing a light beam, adjustable slides shiftable along the station dial and designed as opaque but translucent screens arranged closely to the station dial, a drive for moving the pointer together with the light source along the station dial, the light beam of said source thus simultaneously impinging on said adjustable slides for exactly indicating the adjustment of the tuning elements of the receiver, and means for forming the contour of the light beam, said adjustable slides being supplied with tuning marks, and said means for forming the contour of the light beam consisting of a mask giving the light beam a contour suitable for said tuning marks.

2. Tuning indicator mechanism for radio receivers, comprising a station dial, a pointer, a light source for producing a light beam, adjustable slides shiftable along the station dial and designed as opaque but translucent screens arranged closely to the station dial, a drive for moving the pointer together with the light source along the station dial, the light beam of said source thus simultaneously impinging on said adjustable slides for exactly indicating the adjustment of the tuning elements of the receiver, and means for forming the contour of the light beam, said adjustable slides designed as opaque but translucent screens being supplied with a tuning mark subdividing the light beam, said means for forming the contour of the light beam consisting of a mask interposed between the light source and said adjustable screens and forming the contour of the light beam suitable for the tuning mark on said slidable screens.

3. Tuning indicator mechanism as claimed in claim 2, wherein the tuning mark on said screens is a little smaller than the width of the impinging beam of light, thus subdividing the light beam of said light source into two single equal sections on the screen in case of exact tuning adjustment of the receiver.

4. Tuning indicator mechanism as claimed in claim 2, wherein the tuning mark on said screens and the mask for forming the contour of the light beam outline a wedge, the thin ends of the light wedge produced by said mask and of the wedge outlined by the tuning mark coinciding one with another on said screens in case of exact tuning adjustment of the receiver.

5. Tuning indicator mechanism as claimed in claim 2, wherein the tuning mark on said screens and the mask for forming the contour of the light beam outline two wedges lying one above another so that their thin ends are joined, the thin ends of the light wedges produced by said mask and of both the wedges of said tuning mark coinciding one with another on said screens in case of exact tuning adjustment of the receiver.

6. Tuning indicator mechanism as claimed in claim 5, wherein the tuning mark on the sliders and the light beam are colored.

7. Tuning indicator mechanism as claimed in claim 1, wherein the pointer is designed as a glass rod and mounted on a lamp casing including the light source, reflector means and the mask for forming the contour of the light beam, said glass rod being illuminated by said light source, which also produces the light beam impinging on the adjustable slides for indicating the exact adjustment of the tuning elements.

References Cited in the file of this patent

UNITED STATES PATENTS

| Number | Name | Date |
|---|---|---|
| 1,734,694 | Schwartz | Nov. 5, 1929 |
| 2,120,136 | Lyman | June 7, 1938 |
| 2,582,951 | Barry | Jan. 22, 1952 |